(12) United States Patent
Stavely et al.

(10) Patent No.: US 7,193,616 B2
(45) Date of Patent: Mar. 20, 2007

(54) SYSTEMS AND METHODS FOR FACILITATING COMPOSITION OF HANDWRITTEN DOCUMENTS

(75) Inventors: Donald J. Stavely, Windsor, CO (US); Wilfred F. Brake, Ft. Collins, CO (US); Dan L. Dalton, Greeley, CO (US); James C. Dow, Ft. Collins, CO (US); Amy E. Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 10/448,789

(22) Filed: May 30, 2003

(65) Prior Publication Data

US 2004/0239639 A1    Dec. 2, 2004

(51) Int. Cl.
*G09G 5/00* (2006.01)
*G06F 3/00* (2006.01)
*G06K 9/00* (2006.01)

(52) U.S. Cl. .................. 345/173; 345/179; 178/18.3; 715/745; 715/773; 715/784; 715/788; 382/187

(58) Field of Classification Search ................ 345/173, 345/174, 179, 180, 745, 749, 780, 784, 788; 382/187; 715/745, 779, 780, 784, 788
See application file for complete search history.

(56) References Cited

U.S. PATENT DOCUMENTS 4,727,588 A * 2/1988 Fox et al. .................... 382/189
5,231,698 A * 7/1993 Forcier ........................ 715/541
5,583,543 A * 12/1996 Takahashi et al. ........... 345/173
5,680,480 A * 10/1997 Beernink et al. ............ 382/187
5,768,417 A * 6/1998 Errico et al. ................. 382/186
5,838,302 A * 11/1998 Kuriyama et al. ........... 345/173
5,897,648 A * 4/1999 Henderson ................... 715/530
6,005,973 A * 12/1999 Seybold et al. .............. 382/187
6,188,789 B1 * 2/2001 Marianetti et al. .......... 382/189
6,256,009 B1 * 7/2001 Lui et al. ..................... 345/684
6,326,957 B1 * 12/2001 Nathan et al. ............... 345/179
6,661,409 B2 * 12/2003 Demartines et al. ......... 345/173
6,977,675 B2 * 12/2005 Kotzin ..................... 348/208.2
2003/0038788 A1 * 2/2003 Demartines et al. ......... 345/173
2004/0263486 A1 * 12/2004 Seni ............................ 345/173

FOREIGN PATENT DOCUMENTS

| JP | 01-306916 A | 12/1989 |
|---|---|---|
| JP | 08-235119 A | 9/1996 |
| JP | 2002-278700 A | 9/2002 |
| WO | WO 03/019522 | 3/2003 |

* cited by examiner

Primary Examiner—Henry N. Tran

(57) ABSTRACT

Disclosed are systems and methods for facilitating composition of handwritten documents. In one embodiment, a system and method pertain to identifying handwritten input entered in a display of a computing device, and controlling the placement of handwritten input on the display so as to enable uninterrupted handwriting on the display.

25 Claims, 9 Drawing Sheets

SYSTEMS AND METHODS FOR FACILITATING COMPOSITION OF HANDWRITTEN DOCUMENTS

BACKGROUND

Many portable computing devices such as personal digital assistants (PDAs) and tablet computers comprise touch-sensitive displays with which users can enter information. For example, users can typically handwrite notes on the touch-sensitive displays of PDAs using a writing implement such as a pen or stylus.

Although this handwriting functionality is useful for jotting down quick notes, it is less useful for composing larger documents, such as letters, if the touch-sensitive display is relatively small. The touch-sensitive displays of most PDAs are only a few inches wide. Therefore, if the user wishes to handwrite a relatively large document, the user will only be able to write a few words on the display before having to move his or her writing implement down to the next "line" of the display.

The above-described handwriting method is disadvantageous for several reasons. First, this process is inconvenient for the user because the user must continually interrupt the user's writing to move down to the next line of the display. Therefore, entry of information is slow and the user's thought process may be frequently interrupted. This inconvenience is magnified in situations in which the user must manually scroll the display down to obtain more space on which to write. In addition, writing using this method causes the user to feel "cramped" by the physical constraints of the small display. Accordingly, it is unlikely that the user will use the computing device to compose full handwritten documents.

In addition to the difficulties associated with handwriting documents identified above, existing computing devices, such as PDAs, do not provide feedback to the user as to the formatting the document that the user is composing. For instance, if the document being composed is to be printed in hardcopy form, the user is not provided with an indication as to the arrangement of the handwriting on the page that will be printed. In other words, lacking is what-you-see-is-what-you-get (WYSIWYG) feedback during the handwriting process.

SUMMARY

Disclosed are systems and methods for facilitating composition of handwritten documents. In one embodiment, a system and method pertain to identifying handwritten input entered in a display of a computing device, and controlling the placement of handwritten input on the display so as to enable uninterrupted handwriting on the display.

BRIEF DESCRIPTION OF THE DRAWINGS

The disclosed systems and methods can be better understood with reference to the following drawings. The components in the drawings are not necessarily to scale.

DETAILED DESCRIPTION

As identified above, composing handwritten documents on touch-sensitive displays of computing devices can be inconvenient, particularly in situations in which the display is small. As is described below, however, such documents may be created more conveniently if the computing device is configured to pan or scroll handwritten input, such as text, that has already been entered while the user continues to write. When the handwritten input is manipulated in this manner, the user can write continuously without running out of space on the display and, therefore, without having to manually move down to the next "line" of the display to continue handwriting. In particular, the user may handwrite on the display without moving his or her hand from a designated entry point on the display. Instead, the relative movement between the user's hand and the virtual page on which the user is writing is provided by the panning of the handwritten input (as well as the virtual page) while the user writes.

In one mode of operation, the position of the entered handwriting on the virtual page is monitored to facilitate automatic shifting to the next line of the page (i.e., wrap-around), and to provide the user with an indication of the document's format as it is being created. Therefore, the user need not interrupt his or her handwriting to manually shift to the next line of the virtual page once an existing line is completed. Moreover, the user obtains feedback as to the formatting of the document in that a what-you-see-is-what-you-get (WYSIWYG) document is displayed to the user during handwriting entry.

Figure 1:
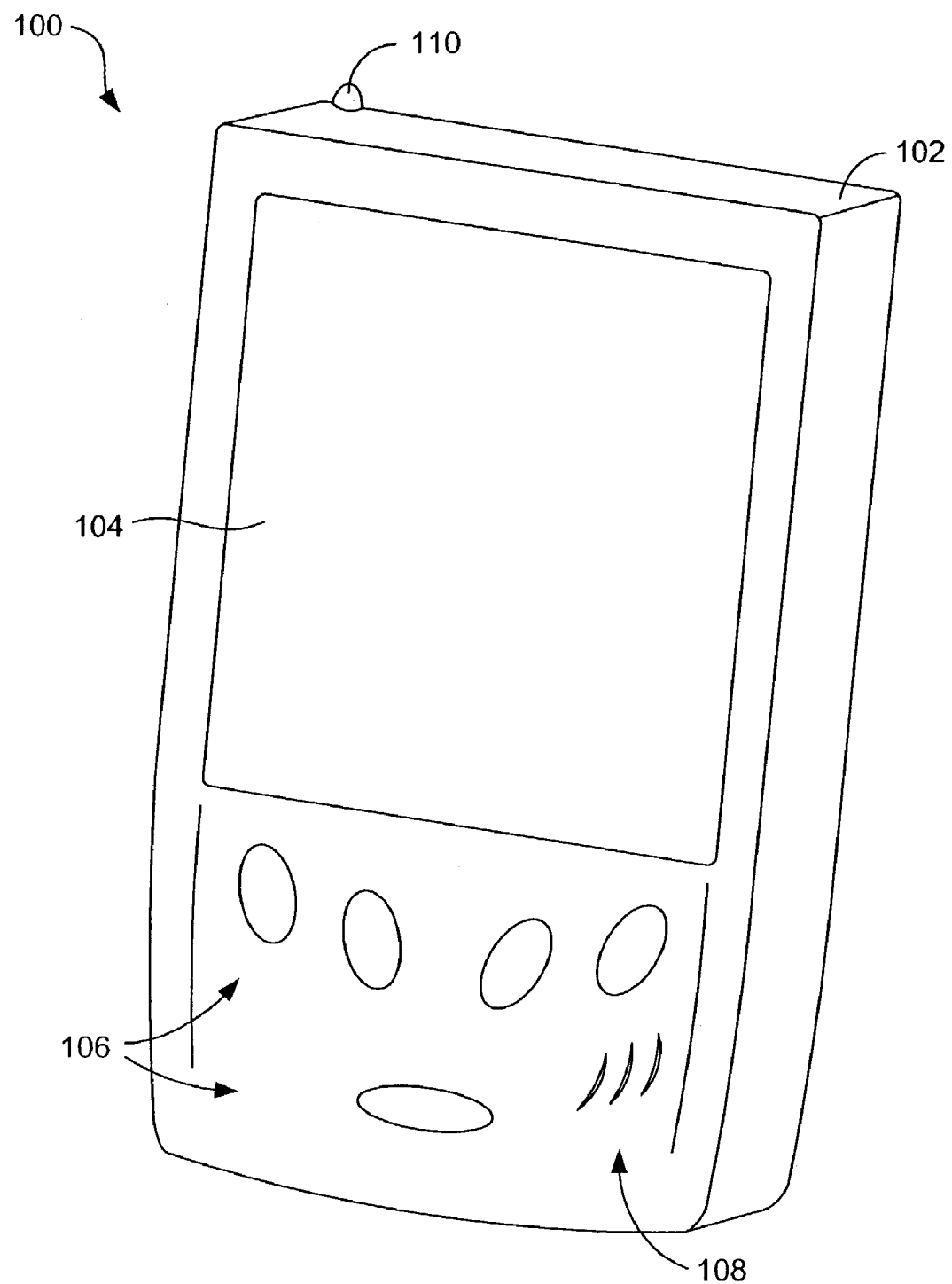
FIG. 1 is a perspective view of an embodiment of a computing device that is configured to receive and process handwritten input.

Referring now in more detail to the figures in which like numerals identify corresponding parts, FIG. 1 illustrates an embodiment of a computing device 100 that facilitates handwriting of documents. In the example embodiment of FIG. 1, the computing device 100 is a portable computing device and, more particularly, a personal digital assistant (PDA). Although a PDA is illustrated in the figure and specifically described herein, the functionalities described in this disclosure can be provided by nearly any computing device that includes a touch-sensitive input device (display or pad). Generally, however, the computing device comprises a touch-sensitive input device that has an area that is smaller than that of the page on which the document is to be composed.

As indicated in FIG. 1, the computing device 100 comprises a housing 102 that frames a touch-sensitive display 104. Although capable of other configurations, the display 104 typically comprises a pressure-sensitive liquid crystal display (LCD) with which input can be entered using an appropriate writing implement such as a stylus or pen. In that the computing device 100 is small so as to be highly portable, the display 104 is likewise relatively small, for instance only a few inches wide by a few inches tall.

Provided on the housing 102 below the display 104 are several keys or buttons 106 that may be used to control operation of the computing device 100. Optionally, the computing device 100 further includes a speaker 108 that is used to generate audio signals. Further indicated in FIG. 1 is the end of a stylus 110 (shown stowed within the computing device 100), which may be used to handwrite on the display 104.

Figure 2:
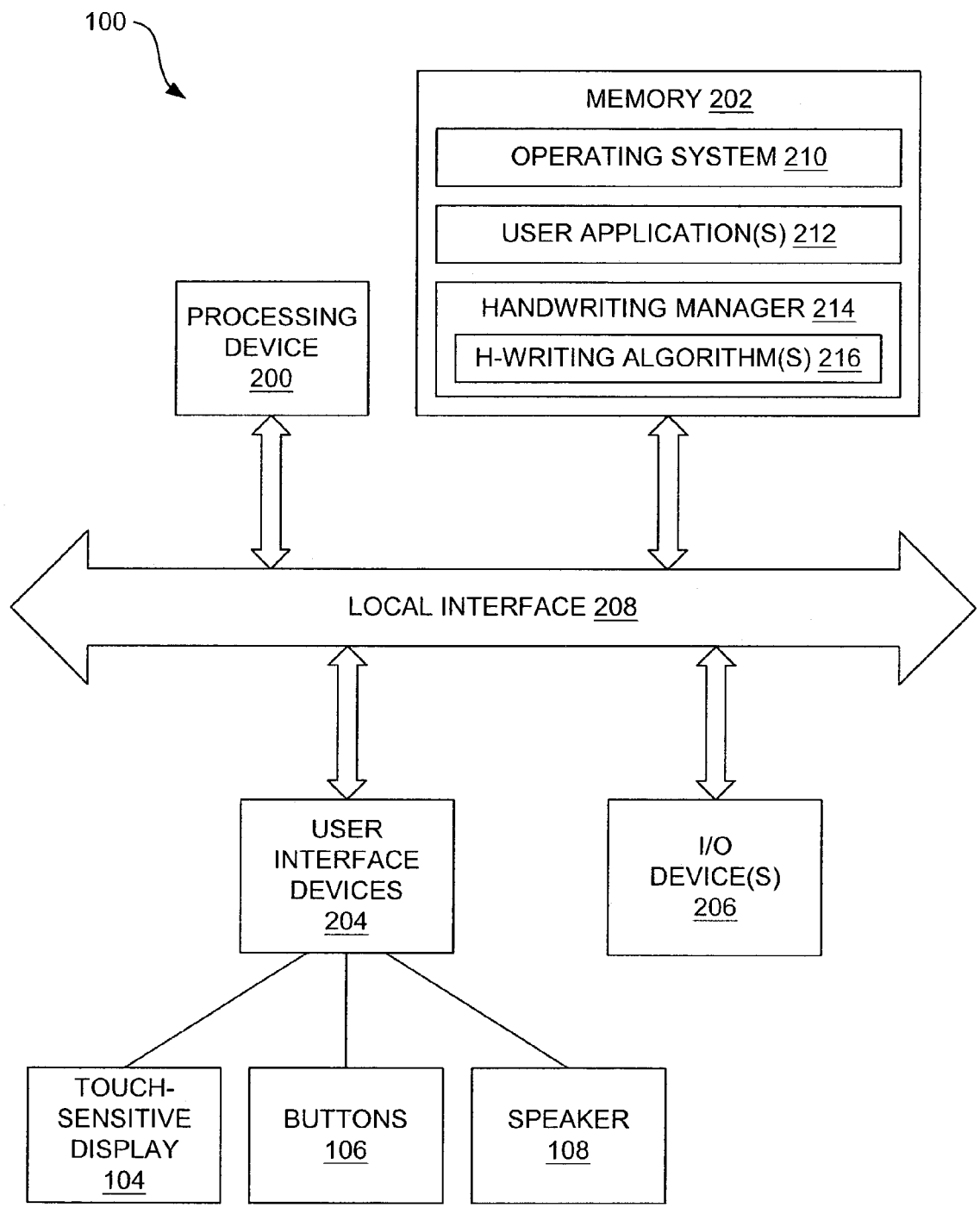
FIG. 2 is a block diagram of an embodiment of the architecture of the computing device shown in FIG. 1.

FIG. 2 is a block diagram illustrating an example architecture for the computing device 100 of FIG. 1. As indicated in FIG. 2, the computing device 100 comprises a processing device 200, memory 202, user interface devices 204, and input/output (I/O) devices 206, each of which is connected to a local interface 208.

The processing device 200 comprises any one of a general-purpose processor, a microprocessor, one or more application-specific integrated circuits (ASICs), a plurality of suitably configured digital logic gates, or other electrical configuration comprised of discrete elements that coordinate the overall operation of the computing device 100. The memory 202 includes any one or a combination of volatile memory elements (e.g., random access memory (RAM)) and nonvolatile memory elements (e.g., Flash).

The user interface devices 204 include the buttons 106 first identified in FIG. 1. In addition, the user interface devices 204 include the display 104 both because it conveys visual information to the user and because, in that it is touch-sensitive, the display is used to receive information such as handwritten text. The user interface devices 204 further include the speaker 108 in that it conveys audible information to the user.

The I/O devices 206 comprise those devices that enable communication between the computing device 100 and another device such as a personal computer (PC) or printer. Accordingly, these devices 206 can comprise, for example, a universal serial bus (USB) connector and/or an infrared (IR) or radio frequency (RF) transceiver.

The memory 202 comprises various programs (in software and/or firmware) including an operating system (O/S) 210, one or more user applications 212, and a handwriting manager 214. The O/S 210 controls the execution of other programs and provides scheduling, input-output control, file and data management, memory management, and communication control and related services. The user applications 212 comprise one or more programs that enable the user to compose handwritten documents. Example applications include word processing applications, email applications, and the like.

The handwriting manager 214 comprises a program that controls the graphical user interface (GUI) presented in the display 104 when the user handwrites a document. More specifically, the handwriting manager 214 "moves" a virtual page across the display while the user enters handwrites text or other input using a handwriting algorithm 216 so that the user can handwrite characters and words without moving his or her hand across the display. With this manner of control, the user may handwrite continuously without running out of space on the display and therefore without having to manually move his or her writing implement down to a next line of the display or virtual page. Therefore, the user may handwrite lines of text or other input that are longer than the width of the display. Operation of the handwriting manager 214 in providing this functionality is discussed with reference to FIGS. 3–7.

Various programs have been described above. These programs can be stored on any computer-readable medium for use by or in connection with any computer-related system or method. In the context of this document, the computer-readable medium can be, for example, an electronic, magnetic, optical, electromagnetic, infrared, or semiconductor system, apparatus, device, or propagation medium. More specific examples of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). The computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example computing device having been described above, device operation in facilitating composition of handwritten documents will now be discussed. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3:
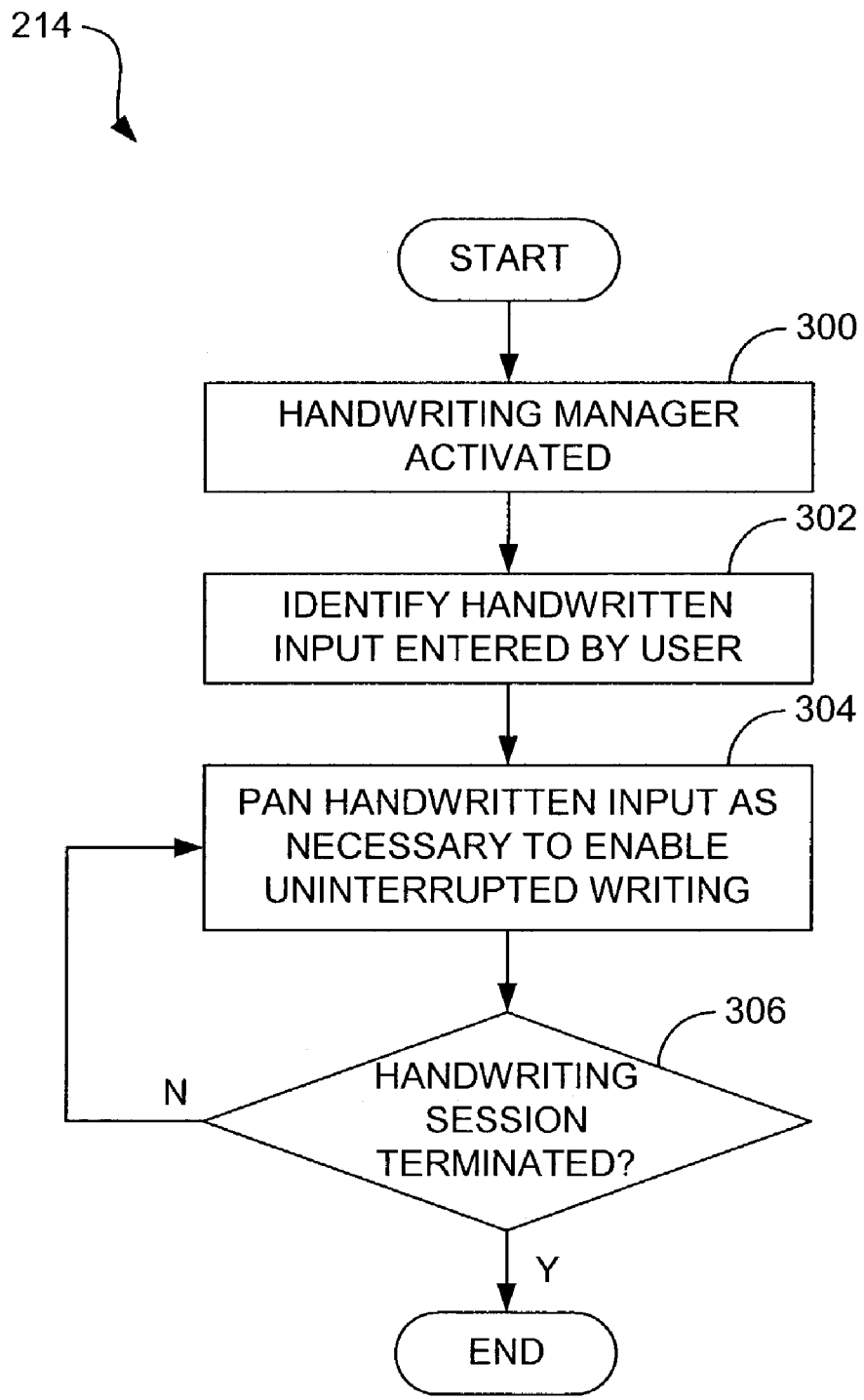
FIG. 3 is a flow diagram that illustrates a first embodiment of operation of the handwriting manager shown in FIG. 2.

FIG. 3 illustrates a first, high-level embodiment of operation of the handwriting manager 214 in controlling handwritten input so as to facilitate composition of a handwritten document. Beginning with block 300, the handwriting manager 214 is activated. This activation can occur in response to various different conditions. In one example, the handwriting manager 214 is activated when a user application 212 that is configured to receive handwritten input is opened by the user. Alternatively, the handwriting manager 214 may be activated manually by the user (e.g., by selecting an appropriate menu option), or activated automatically when handwritten input is detected by the computing device 100.

In any case, once the handwriting manager 214 is activated, it identifies handwritten input by the user, as indicated in block 302, by detecting the input and determining the location at which the input is being entered. Generally, this handwritten input comprises any marks that the user enters on the display, typically using an appropriate implement such as a stylus or pen. Normally, however, this handwritten input comprises textual input such as letters and numerals. As the handwritten input is entered by the user, already entered handwriting is displayed while the display is simultaneously panned or scrolled, typically in a lateral direction, by the handwriting manager 214 to enable uninterrupted writing by the user, as indicated in block 304. Therefore, if the user is handwriting a given word, the letters of the word that have already been input are panned across the display so as to provide room for the next letter of the word. Similarly, as words of a given sentence have been entered, these words are panned across the display so as to provide room for the other words that are to be included in the sentence. With such panning, previously handwritten input may be moved "off-screen" as new input is entered in the same manner that lines of input may be moved off-screen as one scrolls down through a document within a word processing application. Therefore, the input, although not visible, is retained on the virtual page or document.

As is discussed in greater detail below, the speed with which the handwritten input is panned may be controlled relative to the user's particular writing style to ensure correct spacing between consecutive letters and words. Moreover, control is exercised by the handwriting manager 214 to interrupt and resume panning so that extended spaces are not created when the user pauses his or her handwriting.

With reference next to decision block 306, the panning of handwritten input continues until such time it is determined that the handwriting session is terminated. By way of example, termination of the session may be explicitly identified by the user, e.g., by closing the handwriting manager 214, or may by inferred by the manager when the user closes a composed document.

Figure 4A:
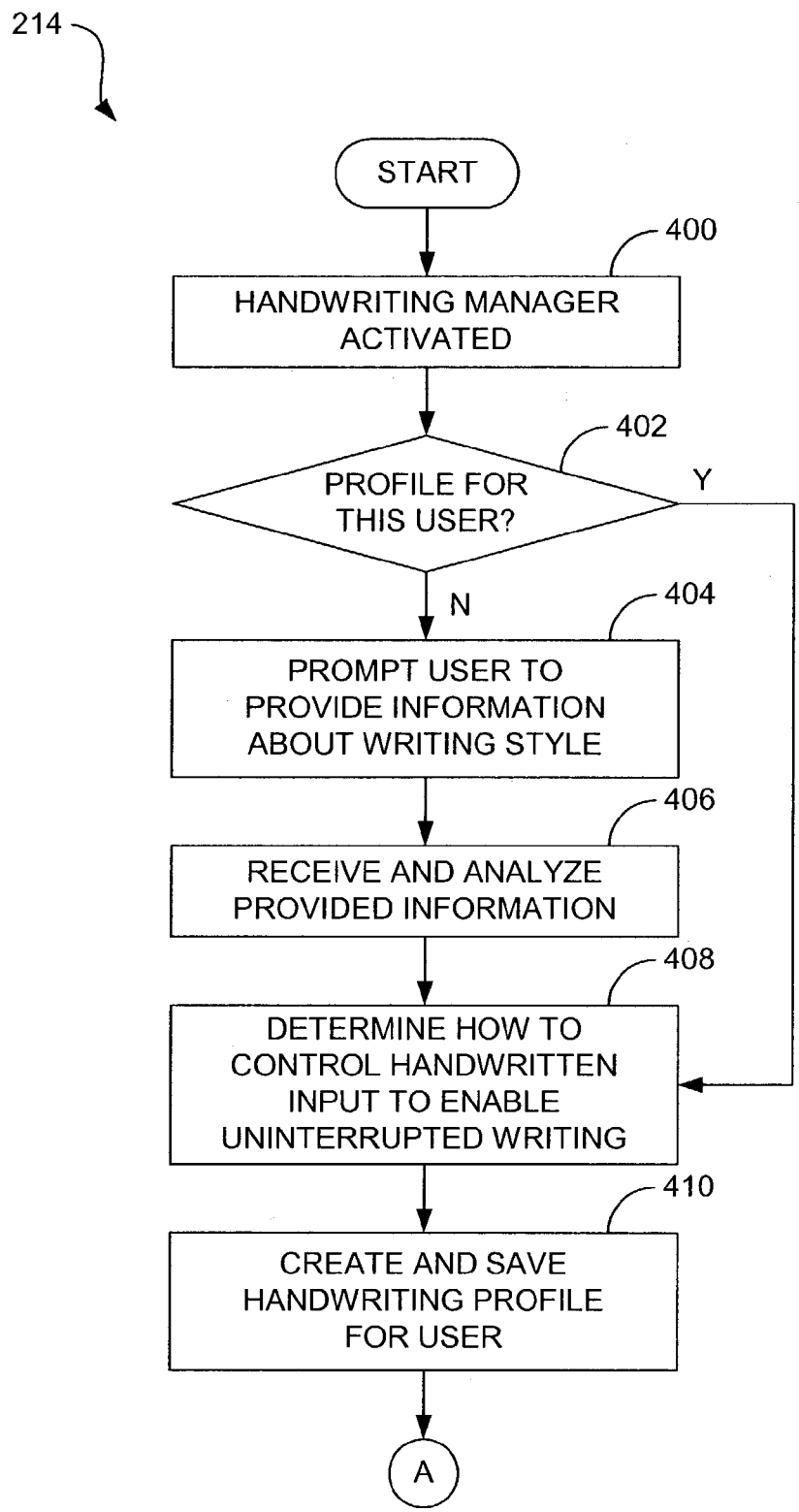
FIGS. 4A and 4B comprise a flow diagram that illustrates a second embodiment of operation of the handwriting manager shown in FIG. 2.
Figure 4B:
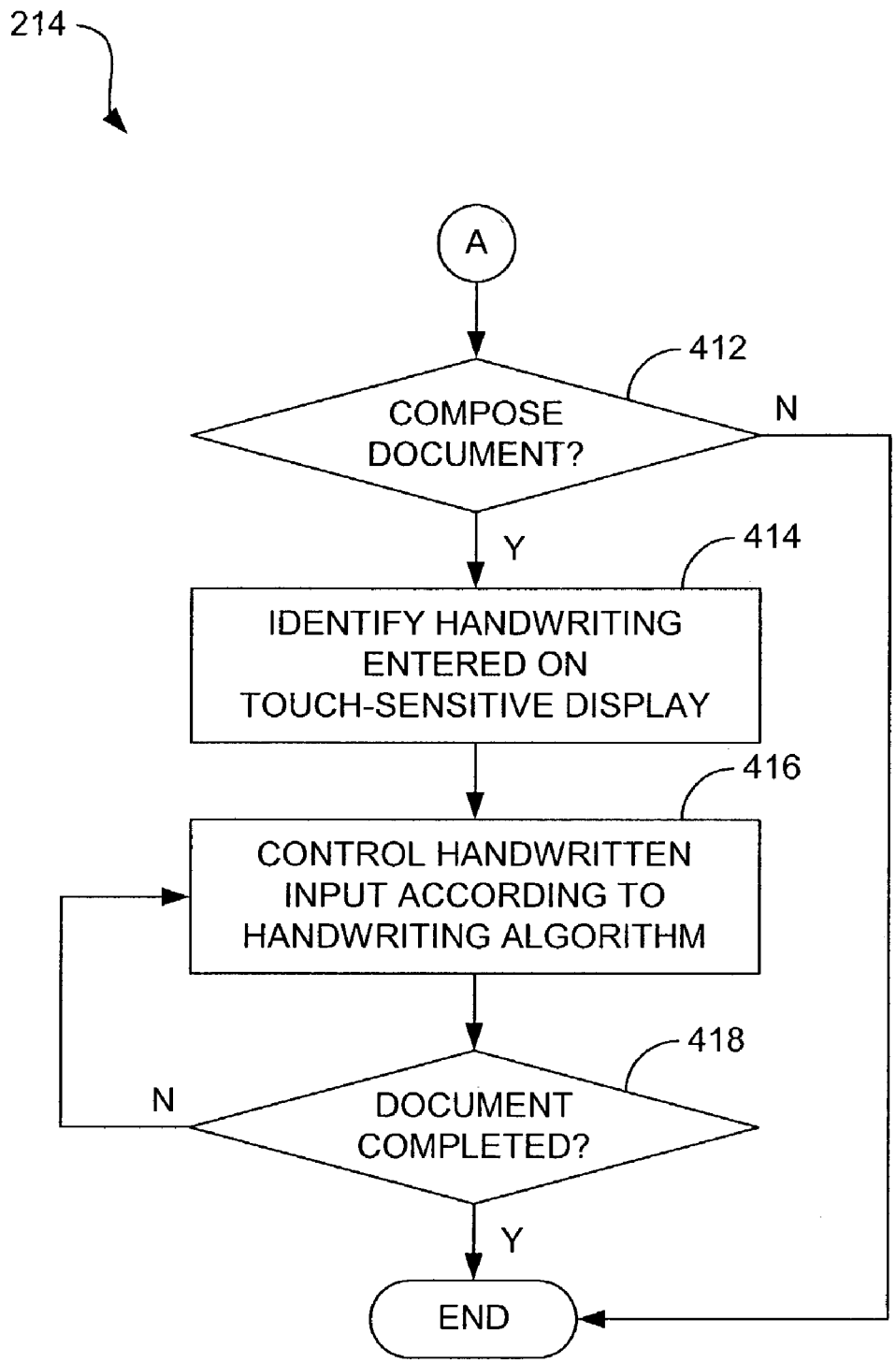

FIGS. 4A and 4B illustrate a second embodiment of operation of the handwriting manager 214 in controlling handwritten input and the virtual page on which it is written. Beginning with block 400 of FIG. 4A, the handwriting manager 214 is activated. Again, this activation can occur in response to various different conditions. Irrespective of the manner in which it is activated, the handwriting manager 214 determines, in decision block 402, whether a handwriting profile exists for the current user. This determination may be made with reference to information provided by the user. For example, upon opening a user application that supports composition of handwritten documents, the user can be prompted for a user name or other identifying information. The handwriting profile contains information about the user's writing style and/or preferences and therefore can be used to more accurately control the handwritten input so that the handwriting will most closely resemble the user's normal handwriting. Each handwriting profile contains information such as the type of handwriting the user prefers (e.g., script or block letters), the speed at which the user handwrites, the speed at which the user typically moves his or her hand across a page when handwriting, the manner in which the user forms characters and words, and the like.

If no such profile exists for the current user, a new profile can be created by prompting the user to provide information about the user's writing style and preferences, as indicated in block 404. This prompting may simply comprise requesting the user to enter selections as to the type of handwriting he or she prefers, whether script or block letters, and the speed at which entered handwriting is to be panned. By way of example, the speed can be selected on a scale from 1 to 10. Alternatively or in addition, the prompting may comprise requesting the user to handwrite a particular sentence or group of sentences on the display so that the handwriting manager 214 can collect information as to the manner in which the user writes including the speed the user forms characters, the speed at which the user moves his or her hand across the display, how often the user picks the writing implement up off of the display when handwriting, how long the user pauses between words, the amount of spacing the user provides between characters and/or words, etc. Once the information is provided by the user (either directly or indirectly), the handwriting manager 214 receives and analyzes the information, as indicated in block 406, and it is used to create and save a handwriting profile for the user, as indicated in block 408, which can be used to tailor the handwriting algorithm 216 for that particular user.

Alternatively, a user profile can be generated automatically without intervention by the user. As handwriting is entered using default settings, the handwriting manager 214 can collect information as to the manner in which the user writes. A profile can be generated after some handwriting has been entered, used to modify the already entered writing, and saved for application for future user entry.

Although the use of a handwriting profile is described in the foregoing, such a profile is not required to facilitate handwriting of documents in accordance with the principles described herein. Instead, default settings may be used to manipulate input handwriting, and the virtual page, if desired. In such a case, the user may adjust the default settings to suit the user's particular writing style and preferences. For instance, if the panning speed is too fast for the user and results in over-spacing between letters and words, the user may simply change the pan speed to a different setting. In the example embodiment described with reference to FIGS. 4A and 4B, however, it is presumed that such a handwriting profile is used.

Return to FIG. 4A, if a handwriting profile already existed (block 402) or if a new profile was created (block 408), the handwriting manager 214 then determines how to control the handwritten input, and the virtual page, so as to enable uninterrupted handwriting, as indicated in block 410. This determination includes both determining the speed at which to pan the handwritten input as well as when to interrupt and resume this panning.

Figure 5B:
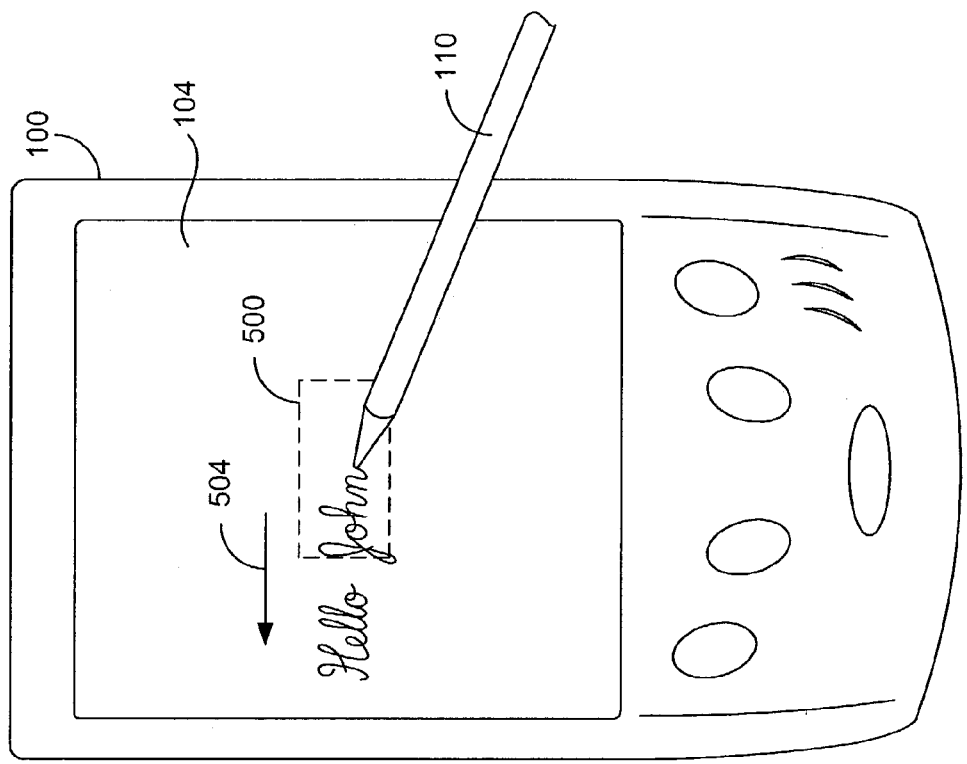
FIGS. 5A and 5B are schematic views of the computing device of FIGS. 1 and 2, depicting entry of handwriting input using a touch-sensitive display of the computing device.
Figure 5A:
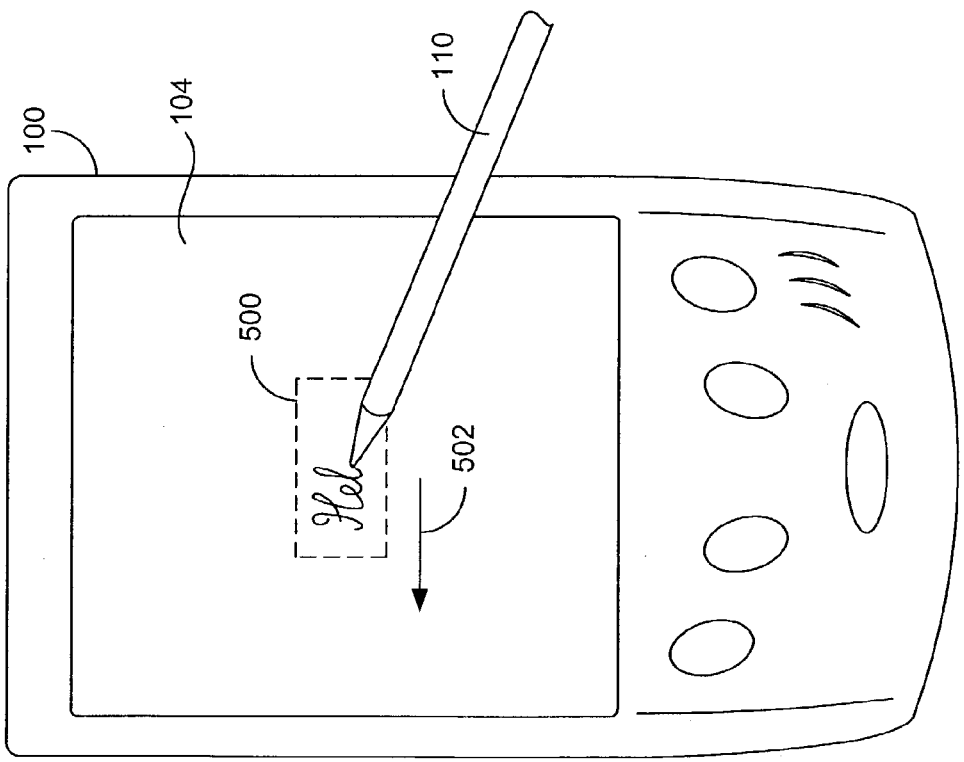

With reference next to decision block 412 of FIG. 4B, it is determined whether the user wishes to compose a document. If not, the handwriting manager 214 presumably was activated only for purposes of creating the handwriting profile. In such a case, flow for the session is terminated. If the user does wish to compose a document, however, a new "document" (i.e., blank virtual page) is presented to the user in the display so that the user may begin handwriting. Next, handwriting input entered by the user is identified, as indicated in block 414. In a first arrangement, the handwriting can be input in any place on the computing device display. In a second arrangement, however, the user is prompted to enter the handwriting in a designated portion of the display. FIG. 5A illustrates such an arrangement. As indicated in this figure, the user handwrites (script in this example) on the display 104 of the computing device 100 using the stylus 110 in an entry field or box 500.

Returning to FIG. 4B, the handwriting manager 214 controls the handwritten input, and therefore the virtual page, according to the handwriting algorithm 216. Again, this algorithm 216 may have been modified in relation to information that was obtained from the user either directly by affirmative user selection, or indirectly by analyzing the user's writing style. In either case, the entered handwriting is panned at an appropriate speed to provide room on the display for the user's next entry. Notably, the panning can be continuous so that the handwritten input constantly moves across the display at a slow pace. Alternatively, the panning can occur in small, discrete steps in response to user input. The latter panning mode may be particularly useful when block writing is used in that the handwritten text can be moved one step after completion of each character (e.g., letter) handwritten by the user. Assuming that the handwritten language is one in which writing is read left to right, the handwritten input is panned to the left across the display.

Due to the panning of the handwritten input, the user may handwrite letters and words without moving his or her the hand across the display because the relative movement between the display (and the virtual page on which the user is writing) and the user is provided by the panning. This phenomenon is illustrated in FIGS. 5A and 5B. As shown in FIG. 5A, the user has begun writing the word "Hello" in the center of the entry box 500. As the letters are written, the handwritten text, and the virtual page on which it is written, pans to the left as indicated by arrow 502, yet the user's stylus 110 remains in the center of the box 500. As writing continues, as indicated in FIG. 5B, words are formed, yet the stylus 110 still remains in the same lateral position on the display 104.

With continued writing, the written words will eventually be panned "off-screen" and, ultimately, the length of the handwritten line of text will exceed the width of the display 104 without the user having to had physically moved the stylus 110 down to a next line of the virtual page. Hence, uninterrupted handwriting is facilitated.

Panning is interrupted upon the expiration of a predetermined period of time in which no user input is received. This feature avoids the creation of long spaces on the virtual page when the user has paused writing (e.g., when the user is thinking about what to write next). Interruption is controlled by starting a timer function after each entry made by the user, as determined by the user lifting the writing implement off of the display. Therefore, if the user is writing in block letters, the timer function is restarted after completion of each letter (or letter portion) handwritten by the user. If the user is writing in script, the timer function may only be started after entry of the last letter of each word. If the predetermined duration of time is exceeded, thereby indicating a pause in handwriting, panning is halted until such time when writing resumes, as indicated by the writing implement again being brought into contact with the display. By way of example, this panning "time out" can occur after the expiration of approximately one half of a second to one second. As with panning speed, the duration for this panning time out may be adjusted in relation to the manner (e.g., speed) with which the user writes and/or user preferences. The time out may be long enough to create an unnaturally long space in the panned text. In this case, the display can be "backed up" to create a nominal space in the text. Then the panning may be resumed from this position when handwriting resumes, as described above.

Other considerations may also be used to control panning of handwritten input. For instance, entry of a period (".") may be interpreted as signaling the end of a sentence and therefore may cause the handwriting manager 214 to pan the virtual page left the equivalent of two spaces and then interrupt panning until the user begins handwriting the first word of the next sentence. In addition, a given user entry may be interpreted as signaling the end of a paragraph and therefore may cause the handwriting manager 214 to move the virtual page such that the entry box 500 aligns with an indented position in the next line of the virtual page.

In addition to enabling the user to write continuously, the panning feature enables the handwritten input to be displayed to the user as it appears on the virtual page and, therefore, as it would appear if the composed document were printed or sent to a designated recipient. For example, if the user is composing a letter that the user will print out on a letter-sized sheet of paper, the handwriting appears to the user as it is arranged on the page that will be printed so that the user is provided with an indication as to what the hardcopy document will look like. In other words, the user is provided with WYSIWYG feedback in that the entered handwriting is only constrained by the boundaries of the virtual page, not by the boundaries of the device display (which presumably is much smaller than the virtual page).

Figure 6A:
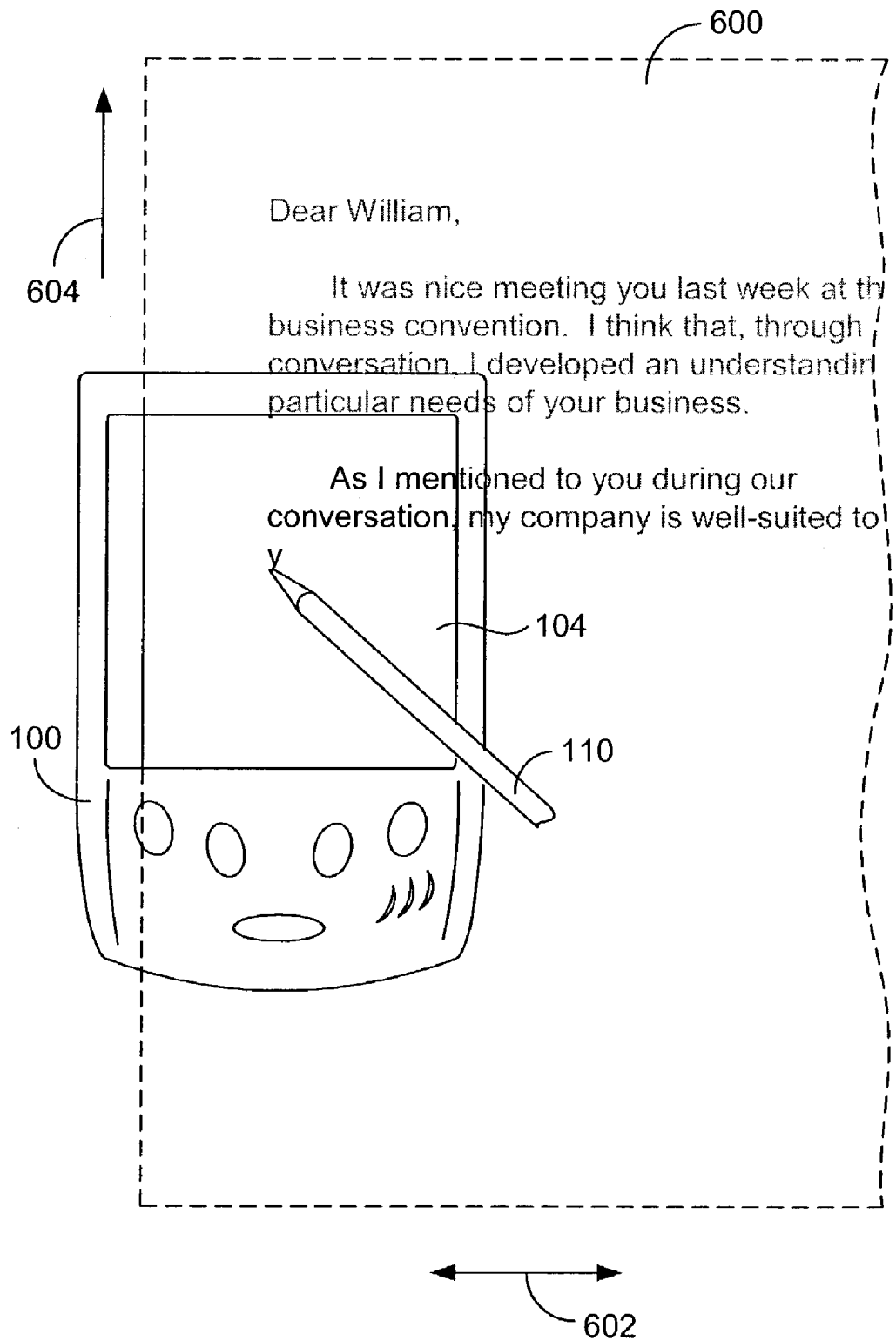
FIGS. 6A and 6B are schematic views illustrating the positioning and movement of a virtual page upon which the user handwrites relative to the computing device.
Figure 6B:
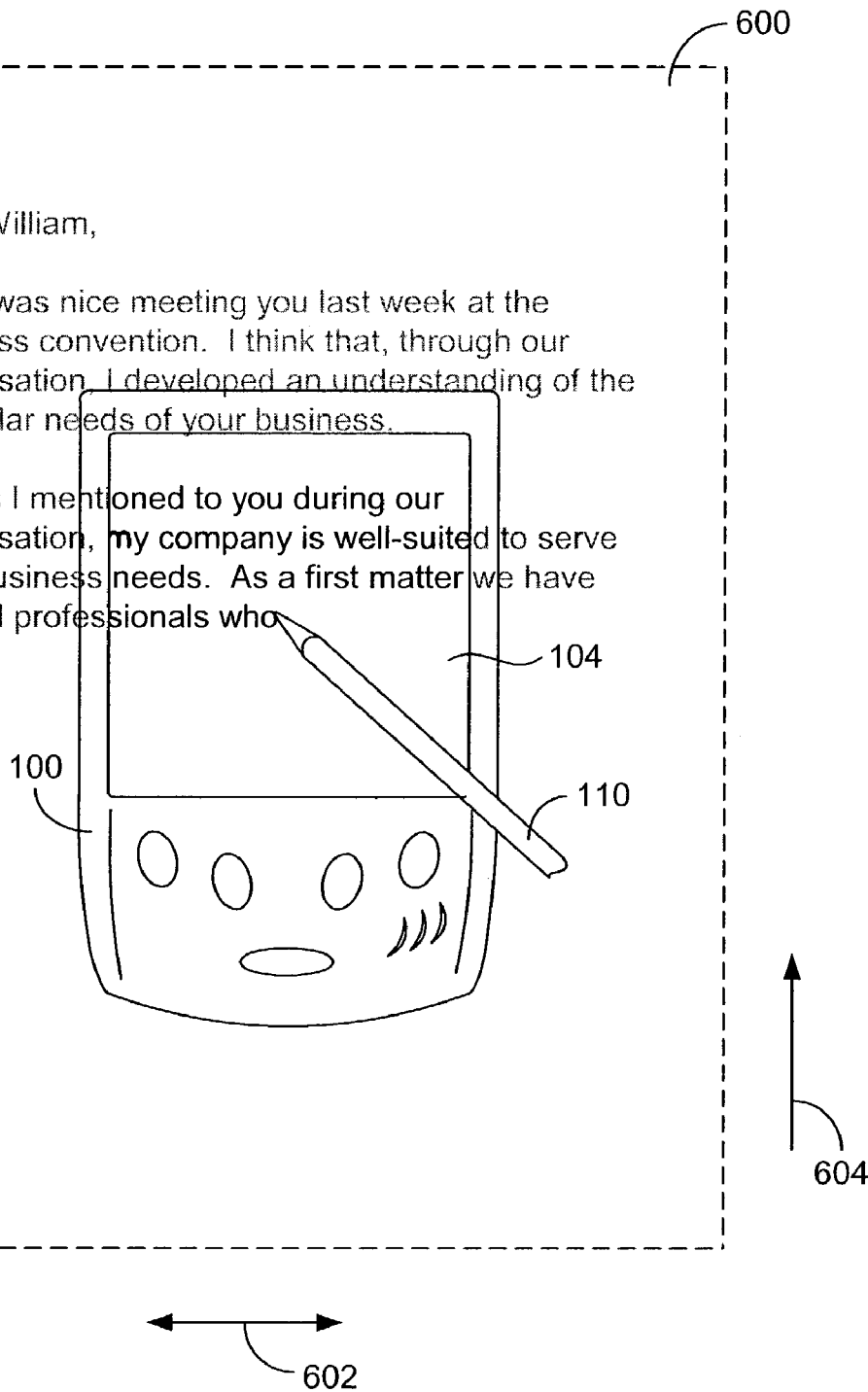
Figure 7:
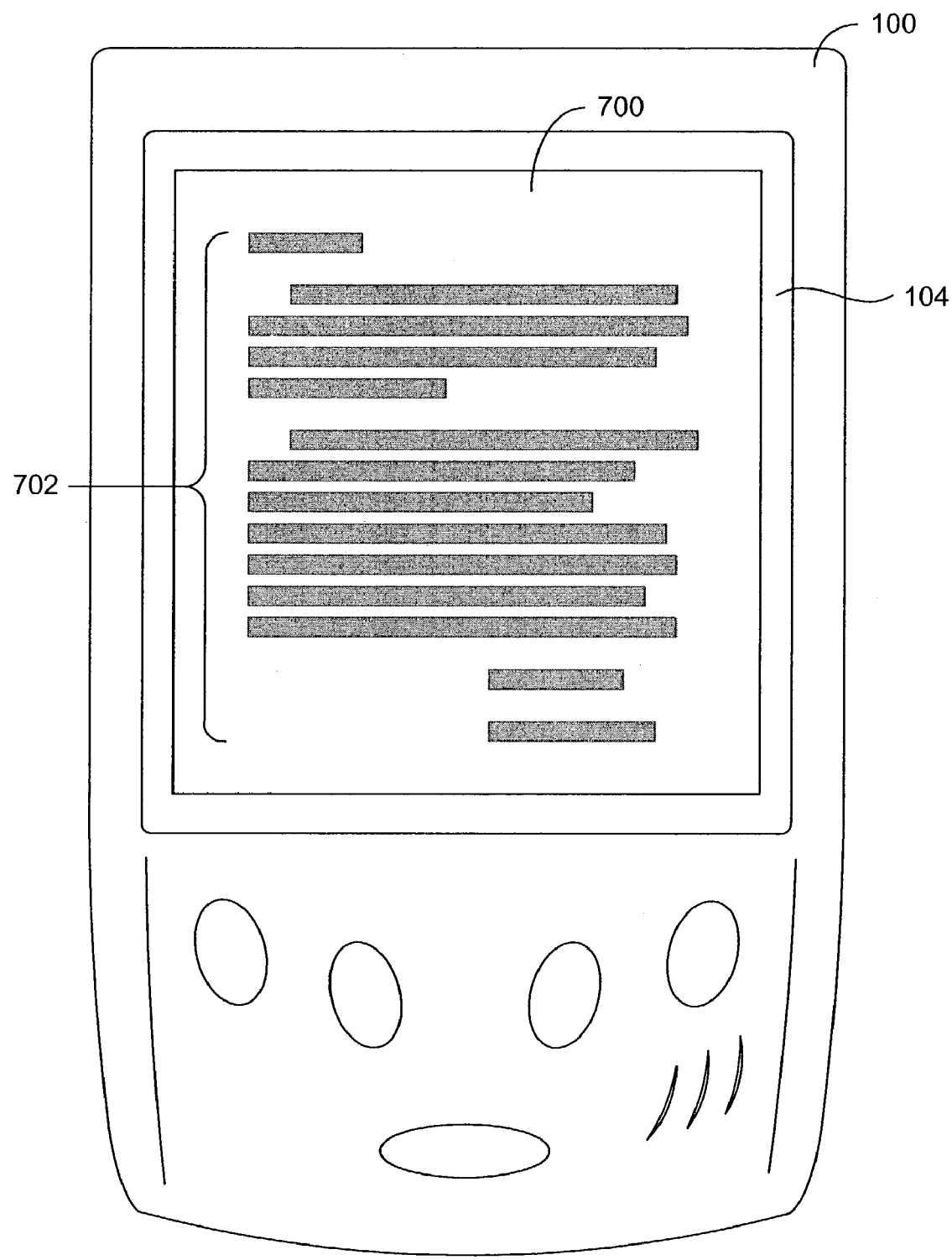
FIG. 7 is a schematic view of the computing device of FIGS. 1 and 2 illustrating display of a preview of an example handwritten document that a user has composed.

This phenomenon is illustrated in FIGS. 6A and 6B. As shown in these figures, as a virtual page 600 (in this case a virtual page equal in size to an 8.5 inch×11 inch sheet of paper), is "moved" relative to the computing device display 104 as new handwriting is entered with the stylus 110 (block letters in this example). In particular, the virtual page 600 is panned to the left as words are written, and then to the right when the input position is shifted to the beginning of the next line of the virtual page, as indicated by double-sided arrow 602. In addition, when the input position is shifted to the next line, the virtual page 600 is moved upward relative to the display 104 as indicated by arrow 604 so that the user, in effect, works downward along the virtual page as the document is composed. As is apparent from FIGS. 6A and 6B, the user is provided with an indication of where on the virtual page 600, and therefore the composed document, he or she is writing in that previously handwritten text is visible and the edges of the virtual page are intermittently apparent (see, e.g., FIG. 6A).

Returning to decision block 418 of FIG. 4B, if the document is not completed, the handwritten input, and the virtual page on which it is written, continues to be controlled in the manner described above. If the document is completed, however, flow is terminated for the handwriting session. At this time, or previously if desired, the user can view the entire composed page in a page preview 700 presented in the display 104 of the computing device 100. Therefore, the user can obtain a clear idea of the formatting of the handwritten input 702 on the virtual page and, therefore, a document that the user may wish to print or transmit.

As described above, the handwriting algorithm 216 more accurately controls the handwritten input on the display when information about the user's writing style and/or preferences is collected. Further improved results are attainable where more information is collected by the handwriting manager 214. For example, handwriting can be entered in a training mode in which various sentences are handwritten by the user and then evaluated by the user to provide feedback to the handwriting manager 214 regarding the accuracy with which the handwritten input emulates the user's normal handwriting. Alternatively or in addition, the user can handwrite a short sentence in a conventional manner by moving the user's hand across the display, and then write the same sentence with panning activated and the user's hand stationary relative to the display for purposes of comparison of the two sentences. Furthermore, user feedback can be provided as or after handwritten documents are composed so that the algorithm 216 can adapt to the user's handwriting style and/or preferences over time.

What is claimed is:

1. A method for facilitating composition of handwritten documents, comprising:

determining how to control the placement of handwritten input within a computing device display;

identifying handwritten input entered within an entry field of the display; and panning a virtual page on which the handwritten input is written relative to the display such that handwritten input is continuously entered within the entry field of the display by a user without the user moving the user's hand across the display, wherein the virtual page is larger than the display and provides the user with an appearance of an actual hardcopy document of the handwritten input.

2. The method of claim 1, wherein determining how to control the placement comprises determining how to control the placement of handwritten input at least in part based upon information contained in a previously-stored handwriting profile.

3. The method of claim 1, further comprising interrupting panning of the virtual page when handwriting is paused.

4. The method of claim 3, further comprising resuming panning of the virtual page when handwriting is resumed.

5. The method of claim 3, further comprising backing up the virtual page when handwriting is paused.

6. The method of claim 5, further comprising shifting the virtual page upward within to the display to facilitate handwriting on a next line of the virtual page.

7. The method of claim 3, further comprising creating the handwriting profile by analyzing the user's handwriting style.

8. The method of claim 7, wherein analyzing the user's writing style comprises analyzing the speed with which the user handwrites.

9. The method of claim 1, wherein panning a virtual page comprises panning the page based at least in part on information contained in a handwriting profile.

10. The method of claim 1, wherein the virtual page is a letter-sized virtual page.

11. The method of claim 10, further comprising displaying the letter-sized page to the user in the display to provide a what-you-see-is-what-you-get (WYSWYG) view of a document the user has created.

12. A system for facilitating composition of handwritten documents, comprising:
    means for identifying handwritten input entered by a user on a touch-sensitive display of a computing device;
    means for moving the handwritten input across the display so as to create space for the user to continue entering handwritten input on the display;
    means for collecting information about a speed in which a user writes to create a handwriting profile for the user that is used to control a speed for moving the handwritten input across the display; and
    means for storing the handwriting profile.

13. The system of claim 12, wherein the means for identifying comprise an entry field designated in the display.

14. The system of claim 12, wherein the means for moving comprise means for panning handwritten input, means for interrupting panning of handwritten input, and means for resuming panning of handwritten input.

15. The system of claim 12, further comprising means for shifting a virtual page on which the handwritten input is written in an upward direction within the display to facilitate handwriting on a next line of the virtual page.

16. A handwriting manager stored on a computer-readable medium, comprising:
    logic configured to determine how to control the placement of handwritten input within a display of a computing device;
    logic configured to identify handwritten input entered by a user in the computing device display; and
    logic configured to control the placement of handwritten input such that handwritten input is continuously entered at a designated position on a virtual page that is larger than the display by a user without the user moving the user's hand across the display, wherein the virtual page shows the user a visualization of an actual hardcopy document of the handwritten input.

17. The manager of claim 16, wherein the logic configured to control the placement of handwritten input is configured to pan the virtual page upon which the handwritten input is written across the display in a leftward direction.

18. The manager of claim 17, wherein the logic configured to control the placement of handwritten input is further configured to interrupt panning when handwriting is paused and resume panning when handwriting is resumed.

19. The manager of claim 16, wherein the logic configured to control the placement of handwritten input is configured to shift the position of the virtual page upon which the handwritten input is written in an upward direction within the display.

20. The manager of claim 16, wherein the logic configured to control the placement of handwritten input comprises a handwriting algorithm.

21. The manager of claim 16, wherein the handwriting algorithm is based at least in part upon the user's particular writing style.

22. A device, comprising:
    a touch-sensitive display with which handwriting is directly entered into the computing device;
    a processor; and
    memory that comprises a handwriting manager, the handwriting manager comprising logic configured to identify handwritten input entered by a user on the computing device display and logic configured to pan a virtual page upon which the handwritten input is applied such that new handwritten input is continuously entered within a designated area of the display by a user and added to the virtual page without the user having to move the user's hand across to the display, the virtual page being larger than the display to show a letter-sized page to the user in the display to provide a what-you-see-is-what-you-get (WYSWYG) view of a document the user has created.

23. The device of claim 22, wherein the handwriting manager further comprises logic configured to interrupt panning when handwriting is paused and resume panning when handwriting is resumed.

24. The device of claim 22, wherein the handwriting manager further comprises logic configured to shift the position of the virtual page upon which the handwritten input is written in an upward direction within to the display.

25. The device of claim 22, wherein the virtual page is a letter-sized virtual page.

* * * * *